United States Patent [19]
Katogi et al.

[11] Patent Number: 5,373,448
[45] Date of Patent: Dec. 13, 1994

[54] KNOCK DETECTION DEVICE FOR AN INTERNAL COMBUSTION ENGINE

[75] Inventors: Kozo Katogi, Hitachi; Takanobu Ichihara; Hiroatsu Tokuda, both of Katsuta, all of Japan

[73] Assignee: Hitachi, Ltd., Tokyo, Japan

[21] Appl. No.: 913,890

[22] Filed: Jul. 16, 1992

Related U.S. Application Data

[63] Continuation-in-part of Ser. No. 690,851, Apr. 24, 1991, Pat. No. 5,230,316.

[30] Foreign Application Priority Data

Jul. 19, 1991 [JP] Japan .................. 3-203768

[51] Int. Cl.$^5$ ............... F02P 5/14; F02P 3/08
[52] U.S. Cl. .............. 364/431.08; 364/431.03; 364/431.04; 123/425; 123/479; 123/435; 73/35; 73/654
[58] Field of Search ........ 364/431.08, 431.07, 364/431.05; 73/35, 654, 651, 116, 660; 128/425, 435, 436; 381/47, 71, 94

[56] References Cited

U.S. PATENT DOCUMENTS

| | | | |
|---|---|---|---|
| Re. 34,234 | 4/1993 | Kuroiwa et al. | 123/425 |
| 4,236,491 | 12/1980 | Hattori et al. | 123/425 |
| 4,409,816 | 10/1983 | Yamaguchi et al. | 73/35 |
| 4,513,716 | 4/1985 | Haraguchi et al. | 123/425 |
| 4,612,902 | 9/1986 | Abe et al. | 123/425 |
| 4,843,870 | 7/1989 | Citron et al. | 73/116 |
| 4,991,553 | 12/1991 | Kurihara et al. | 123/425 |
| 5,170,433 | 12/1992 | Elliott et al. | 381/47 |
| 5,230,316 | 7/1993 | Ichibara | 123/425 |

FOREIGN PATENT DOCUMENTS

| | | |
|---|---|---|
| 3133703C2 | 3/1983 | Germany . |
| 3911554A1 | 10/1990 | Germany . |
| 59-73750 | 4/1984 | Japan . |
| 59-125034 | 7/1984 | Japan . |
| 60-204969 | 10/1985 | Japan . |
| 1178773 | 7/1989 | Japan . |
| 347449 | 2/1991 | Japan . |

*Primary Examiner*—Thomas G. Black
*Assistant Examiner*—Jacques H. Louis-Jacques
*Attorney, Agent, or Firm*—Antonelli, Terry, Stout & Kraus

[57] ABSTRACT

A knock detection device being provided with a plurality of digital filter units, each is designed to cover respective characteristic resonance vibration frequency components inherent to resonance vibration modes due to knocking and including first, second and third digital filters, the first digital filter being tuned to the center frequency of the characteristic resonance vibration frequency component, the second digital filter being tuned to a neighboring lower frequency and the third digital filter being tuned to a neighboring higher frequency. The maximum intensity among the three intensities determined by the first, second and third digital filters is determined as the intensity for the characteristic resonance vibration frequency component and the determined result is fed-back to the digital filter unit to correct the center frequency of the first digital filter to the frequency showing the maximum intensity, whereby the knocking is reliably detected without being affected by such factors as engine operating conditions and secular changes of the engine.

6 Claims, 12 Drawing Sheets

| RESONANCE VIBRATION MODE $P_{nm}$ | RESONANCE VIBRATION FREQUENCY $f_{nm}$ |
|---|---|
| $P_{10}$  | $f_{10} = 6.3$ KHz |
| $P_{20}$  | $f_{20} = 10.4$ KHz |
| $P_{01}$  | $f_{01} = 13.0$ KHz |
| $P_{30}$  | $f_{30} = 14.3$ KHz |
| $P_{11}$  | $f_{11} = 18.1$ KHz |

KNOCK DETECTION DEVICE FOR AN INTERNAL COMBUSTION ENGINE

CROSS-REFERENCE TO RELATED APPLICATION

This application is a continuation-in-part of our prior copending U.S. application Ser. No. 07/690,851, filed on Apr. 24, 1991, now U.S. Pat. No. 5,230,316, issued on Jul. 27, 1993.

BACKGROUND OF THE INVENTION

The present invention relates to a knock detection device for an internal combustion engine such as gasoline engine, for a motor vehicle.

When knocking occurs in an engine, a vibration having a characteristic resonance frequency component inherent to the knock is generated. By detecting such vibration with a knock sensor, generation of knocking can be detected.

In a conventional knock detection device, only one specific frequency component having the highest occurrence frequency is extracted from many components contained in the signal obtained from the knock sensor, and the presence of knocking is judged depending upon the magnitude of the extracted signal level.

Knock detection devices relating to the above explained conventional knock detection device are disclosed, for example, in JP-A-59-73750(1984), JP-A-59-125034(1984), and JP-A-60-204969(1985) which corresponds to U.S. Pat. No. 4,612,902, in JP-A-1-178773(1989), and in JP-A-3-47449(1991) which corresponds to U.S. Pat. No. 4,991,553.

The conventional knock detection devices have not necessarily taken into account the existence of a plurality of vibration modes caused in the engine due to knocking and have treated engine vibration due to knocking associated with some of the vibration modes as noises; accordingly, with the conventional knock detection devices, the occurrence of knocking could not be detected accurately, and further, in some engine operating conditions, in particular in a high speed operating condition, for example at more than 4000 rpm, knock detection with the conventional knock detection device was not very effective. Therefore, the capacity of the conventional knock detection device was limited.

In the conventional knock detection device, only a specific vibration frequency component contained in the signal from the knock sensor was extracted and processed with a band pass filter to detect the occurrence of knocking; however, in an actual engine knocking phenomenon, there are a plurality of characteristic resonance vibration frequency components corresponding to a plurality of resonance vibration modes caused in the engine due to knocking.

Figure 7:
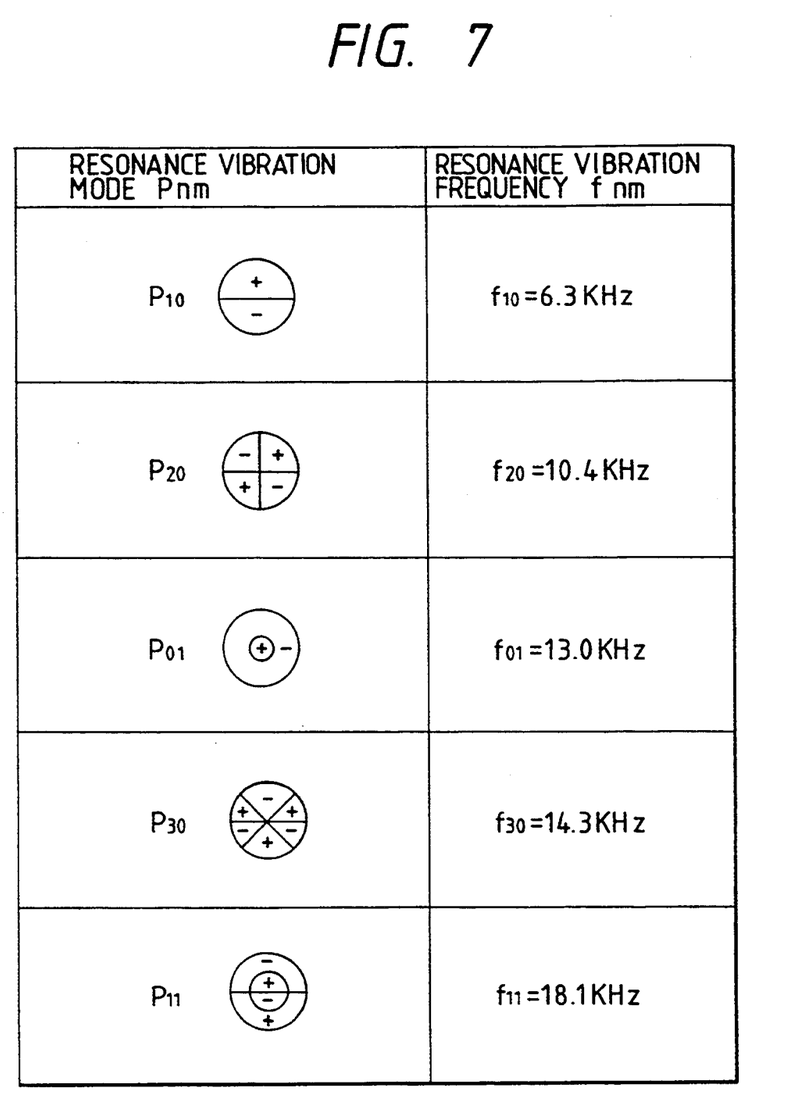
FIG. 7 is a Table for explaining resonance vibration modes caused in an engine cylinder for an internal combustion engine due to knocking and the characteristic resonance vibration frequencies inherent to the respective resonance vibration modes.

FIG. 7 schematically illustrates five resonance vibration modes P10, P20, P01, P30 and P11 which typically occur in an engine cylinder for an internal combustion engine due to knocking and characteristic resonance vibration frequencies f10, f20, f01, f30 and f11 correspond to the respective five resonance vibration modes. Since the nodes and loops of pressure variation due to resonance vibration in the engine cylinder appear in the radial and circumferential directions of the engine cylinder, in the symbols representing the respective resonance vibration modes, the nodes of pressure variation are represented by solid lines, including straight lines and circular lines therein, and the loops of pressure variation are represented by + and −. However, as indicated above, in the conventional knock detection devices, only one specific resonance vibration frequency component, such as f10 or f20, which occurs most frequently, is extracted and processed to determine the occurrence of knocking, with the result that the knock detection capacity with the conventional knock detection devices are limited as indicated above.

Further, the characteristic resonance vibration frequencies due to knocking vary dependent upon the nature of the gas in the engine combustion chamber. Namely, although a resonance wavelength in the engine cylinder is determined by the configuration of the engine combustion chamber, which functions as a resonance cavity, the sonic velocity in the combustion gas increases in response to such factors as the combustion temperature and the compression ratio increase, so that the vibration frequencies increase.

Still further, when the compression ratio is increased, this not only causes an increase in the combustion temperature, but also causes variation of the resonance cavity configuration over a long time span, to thereby change the characteristic resonance vibration frequencies of the respective resonance vibration modes due to knocking.

The conventional knock detection devices were provided with a band pass filter as a countermeasure against the above problem in an effort to expand the band of the band pass filter; as a result, the conventional knock detection devices were more likely to be affected by noises which reduced accurate detection of knocking.

SUMMARY OF THE INVENTION

An object of the present invention is to provide a knock detection device for an internal combustion engine which makes it possible to detect knocking reliably under any engine operating conditions over a long duration by using limited optimum frequency components for analysis so as to perform an accurate engine knocking control.

For achieving the above object, the knocking detection device for an internal combustion engine according to the present invention is provided with a frequency component extracting and analyzing means which separately extracts from an output signal obtained from a knocking sensor a plurality of characteristic resonance vibration frequency components inherent to each of a plurality of predetermined resonance vibration modes due to knocking, and through an integrated judgement of a plurality of the extracted characteristic vibration frequency components, the existence and non-existence of knocking are judged. For this purpose, the frequency component extracting and analysing means extracts at least three neighboring frequencies for the respective characteristic resonance vibration frequency components, and the variation of center frequencies of the respective characteristic resonance vibration frequency components are obtained based upon the amplitude levels of the respective extracted three neighboring frequency components. Then, the center frequencies of the respective characteristic resonance vibration frequency components set in the frequency components extracting and analysing means are shifted based upon the obtained variation result.

In the frequency component extracting and analysing means, a plurality of the respective characteristic resonance vibration frequencies inherent to each of a plurality of the predetermined resonance vibration modes due to knocking are detected separately, and all the detected signals relating to knocking, some of which were conventionally neglected as noises, are incorporated for the integrated knocking judgement. Accordingly, the knock detection capacity of the knock detection device according to the present invention is improved. Further, the center frequencies of the respective characteristic resonance vibration frequency components inherent to each of a plurality of the predetermined resonance vibration modes due to knocking are always corrected based upon the variation of the detected intensities of the three neighboring frequencies for the respective characteristic resonance vibration frequency components; accordingly, with the knock detection device according to the present invention, the existence or non-existence of knocking can be reliably judged, thereby enabling an accurate engine knock control.

DESCRIPTION OF THE PREFERRED EMBODIMENT

Hereinbelow, the knock detection device for an internal combustion engine according to the present invention will be explained in detail with reference to one embodiment thereof shown in the drawings.

Figure 6:
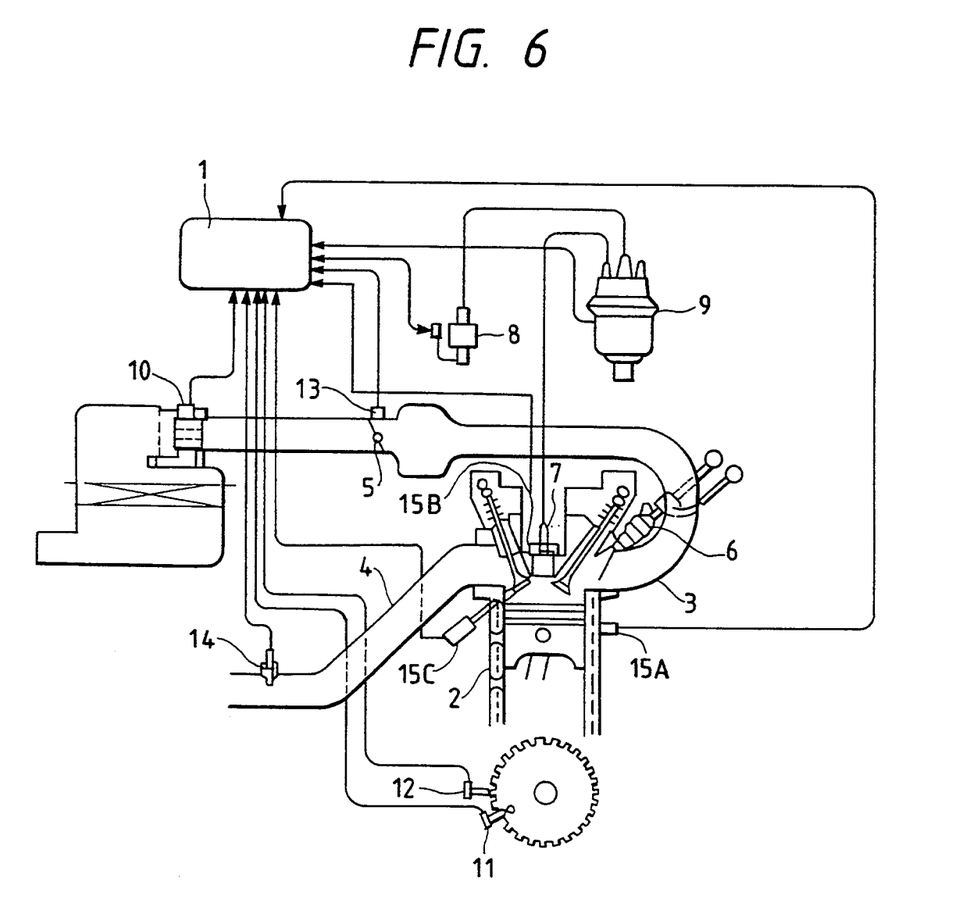
FIG. 6 is a diagram showing an engine control device for an internal combustion engine to which the knock detection devices according to the present invention are applied.

FIG. 6 shows a schematic diagram of an engine control device for an internal combustion engine to which the knocking control device according to the present invention is applied. In FIG. 6, 1 is an engine control unit, 2 is an engine cylinder, 3 is an intake pipe, 4 is an exhaust pipe, 5 is a throttle valve, 6 is a fuel injection valve, 7 is an ignition plug, 8 is an ignition coil, 9 is a distributer, 10 is an air flow sensor for measuring the intake air flow rate, 11 is a reference angle sensor for discriminating cylinders, 12 is a position angle sensor for measuring the rotating angle of the engine shaft, 13 is a throttle opening degree sensor, 14 is an $O_2$ sensor for detecting air/fuel ratio, 15A is a knocking vibration sensor, 15B is a seat pressure sensor and 15C is a cylinder internal pressure sensor.

The engine control unit 1 is constituted by a microcomputer and many kinds of electronic circuits, receives many kinds of sensor signals for determining the present engine operating condition, such as signals from the air flow sensor 10, the reference angle sensor 11, the position angle sensor 12, the throttle valve opening degree sensor 13 and the $O_2$ sensor 14, prepares many kinds of actuating signals based upon a predetermined calculation processing and controls the engine by operating the fuel injection valve 6 and the ignition coil 8.

The knocking vibration sensor 15A, the seat pressure sensor 15B and the cylinder internal pressure sensor 15C, respectively, serve as a knocking signal detecting means. The knock vibration sensor 15A is mounted on the engine cylinder block in the vicinity of the combustion chamber and functions to detect the vibration accompanying combustion in the engine and to convert the detected vibration into an electrical signal. The seat pressure sensor 15B is disposed at the washer portion of the ignition plug 7 and functions to directly detect the vibration in the combustion chamber and to convert the detected vibration into an electrical signal. The cylinder internal pressure sensor 15C is installed in the cylinder head of the combustion chamber by drilling a hole thereinto and functions to directly detect the vibration in the combustion chamber and to convert the detected vibration into an electrical signal.

For realizing the present embodiment, it is sufficient when only one knocking signal detecting means is provided so that one of the knocking vibration sensor 15A, the seat pressure sensor 15B and the cylinder internal pressure sensor 15C is applied for the present embodiment.

As explained in connection with FIG. 7, when knocking is caused in the engine cylinder, one of the five resonance vibration modes P10, P20, P01, P30 and P11 is typically induced in the engine cylinder and a vibration having the characteristic resonance frequency corresponding to the induced resonance vibration mode is generated. Therefore, it is required that the knocking signal detecting means be able to detect all of the knocking induced characteristic resonance vibration frequencies ranging from 6.3 KHz to 18.1 KHz.

Accordingly, it is desirable that the knocking signal detection means, such as the knocking vibration sensor 15A, the seat pressure sensor 15B and the cylinder internal pressure sensor 15C, have a uniform sensitivity over the frequency range covering the entire knocking induced characteristic resonance vibration frequencies f10, f20, f01, f30 and f11. For this purpose, a piezoelectric type sensor using a material such as piezoelectric ceramic and quartz is commonly used; accordingly, in the present embodiment, a piezoelectric type sensor is used for the knocking signal detection means.

As explained previously, the engine control unit 1 controls the engine while supplying actuating signals to such elements as the fuel injection valve 6 and the ignition coil 8. Further, in the present embodiment, the engine control unit 1 receives signals from the knocking signal detection means, such as from the knocking vibration sensor 15A, the seat pressure sensor 15B and the cylinder internal pressure sensor 15C, and performs a judgement processing of knocking existence and non-existence and, based upon the knocking judgement result, further performs an engine knocking control which retards the ignition time in a predetermined manner.

Hereinbelow, the knocking judgement processing according to one embodiment of the knock detection devices of the present invention which is incorporated in the engine control unit 1, is explained with reference to FIGS. 1 through 5 and FIGS. 8 through 12, in the which the same reference numerals or letters are used to denote the same or equivalent elements.

Figure 1:
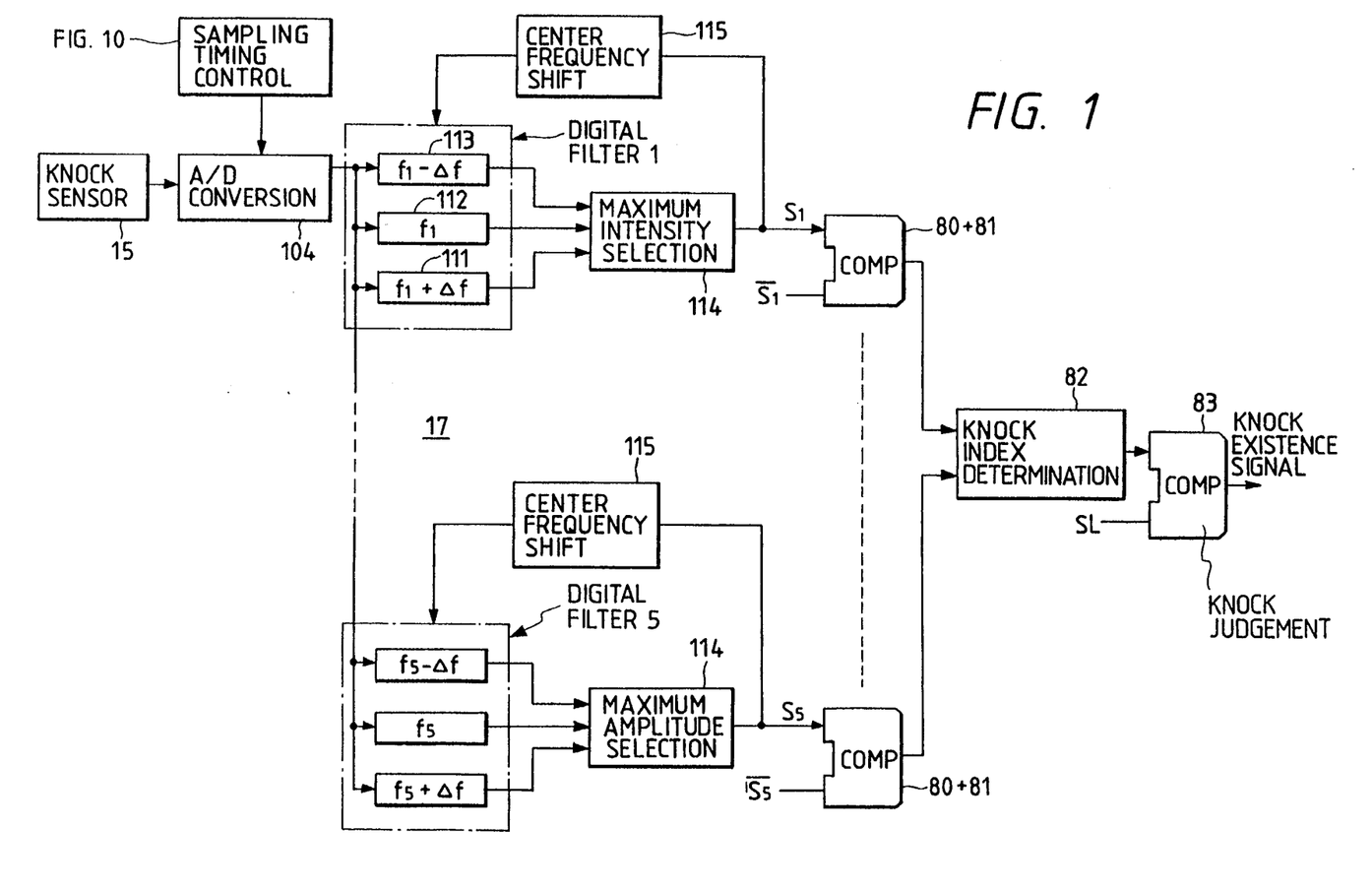
FIG. 1 is a schematic block diagram of a one embodiment of knock detection device according to the present invention.

At first, the signal from a knocking sensor 15 is inputted to respective digital filters 17 serving as frequency extracting and analyzing means after converting the analogue signal from the knocking sensor 15 into a digital signal using an A/D converter 104. Through the digital filters 17, the respective characteristic resonance vibration frequencies are separated and extracted.

Conventionally, analogue type circuit band pass filters were primarily used as the frequency extracting and analyzing means; however, when it is required to extract simultaneously a plurality of frequency components, the same number of analogue circuit band pass filters corresponding to the respective frequency components required to be extracted were needed, which increased the circuit scale and complicated the tuning operations thereof.

In the present embodiment, the knocking signal in analogue form from the knocking sensor 15 is converted into a digital signal by the A/D converter 104, and from the resultant A/D converted signal, the characteristic resonance vibration frequency components inherent to the predetermined resonance vibration modes due to knocking are extracted by the digital filters 17.

The respective resonance vibration frequencies f10, f20, f01, f30 and f11 corresponding to the respective resonance vibration modess, as shown in FIG. 7, vary dependent upon such factors as the type of engine, the shape of combustion chamber and the diameter of engine cylinder bore; however, since the frequency extracting and analyzing means 17 is constituted by digital filters in the present embodiment, such tuning operation in response to the variation of the characteristic resonance vibration frequencies is much facilitated.

Figure 3:
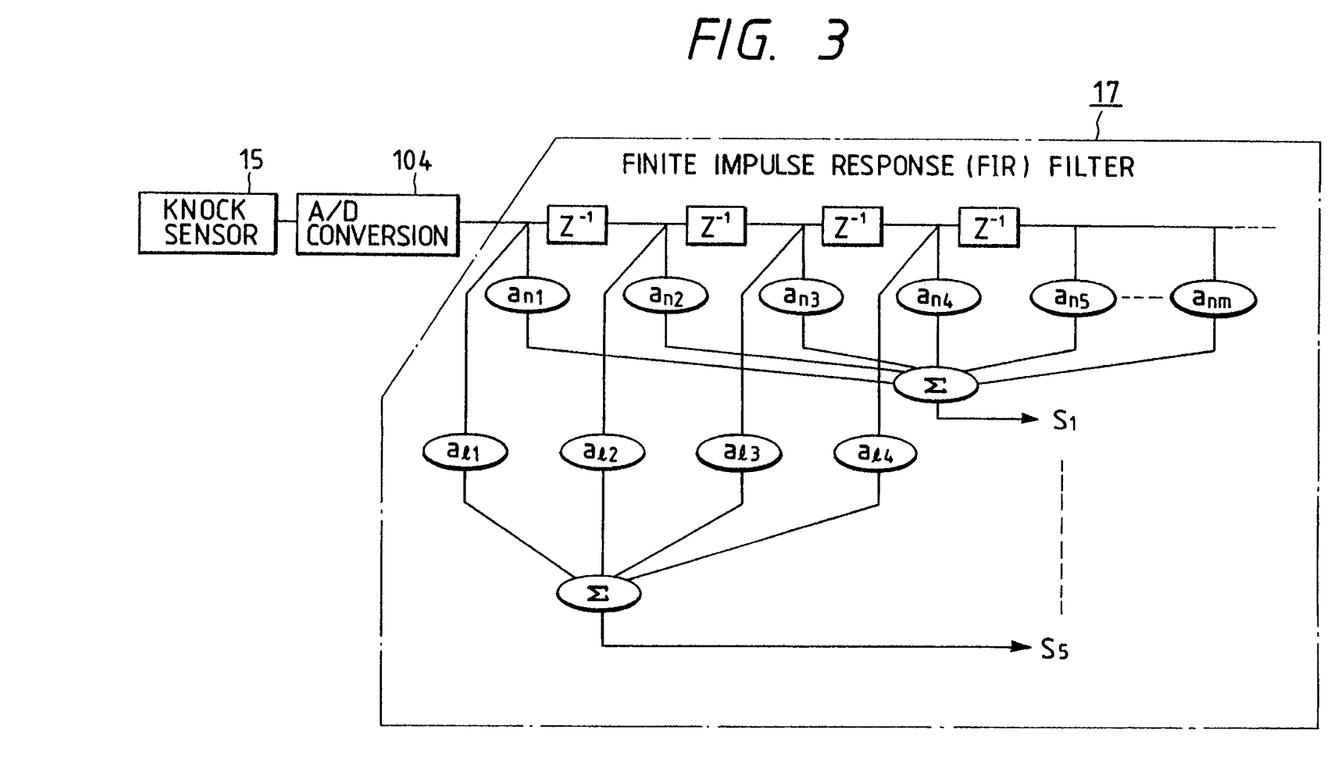
FIG. 3 is a block diagram showing one example of a digital filter which may be used for the frequency analysis unit 17 in FIG. 1.
Figure 4:
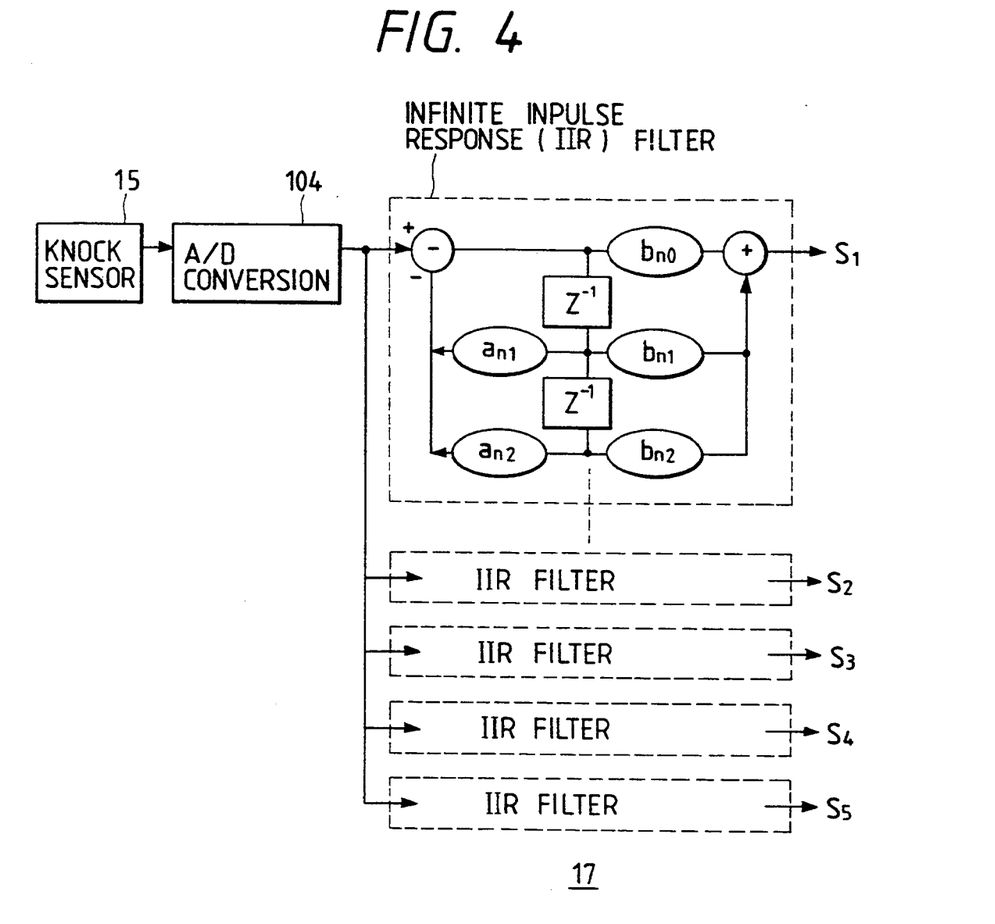
FIG. 4 is a block diagram showing another example of a digital filter which may be used for the frequency analysis unit 17 in FIG. 1.

For such digital filters, a non-regression type digital filter, such as shown in FIG. 3, and a regression type digital filter, such as shown in FIG. 4, are used in the present embodiment, wherein $Z^{-1}$ is delay coefficient, an1 ... amn, al 1 ... al 4 and bn0 ... bn2 are filter coefficients and S1 ... S5 are resultant intensities of the extracted characteristic resonance vibration frequencies.

Figure 5:
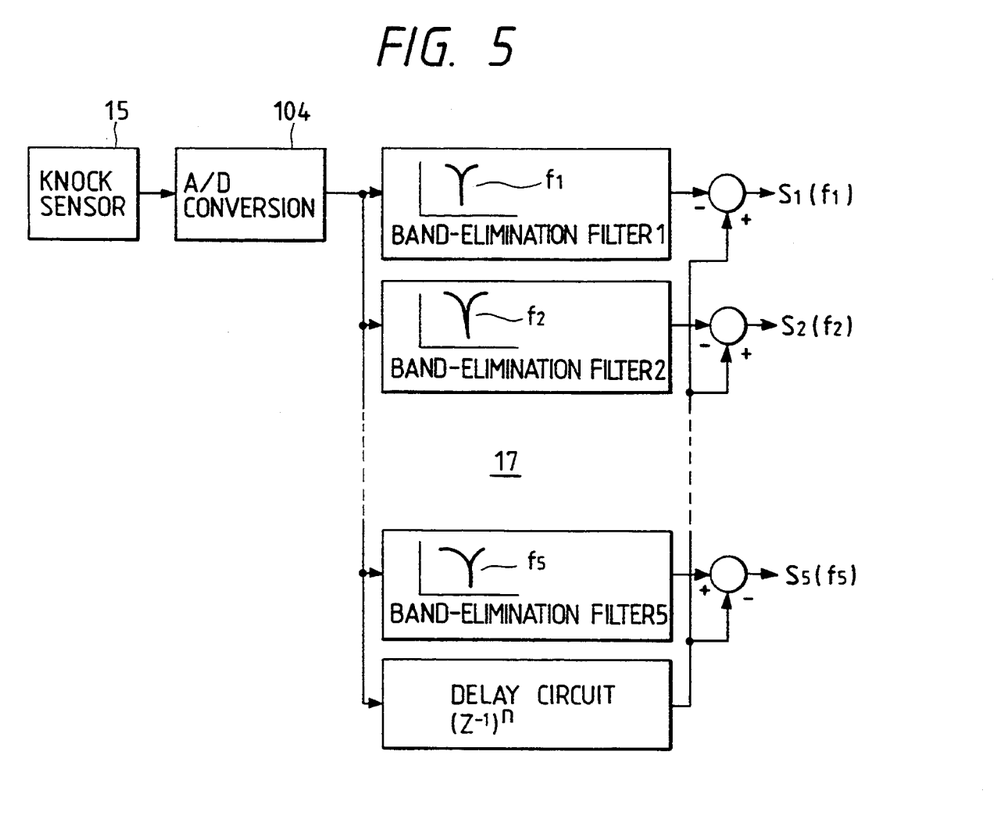
FIG. 5 is a block diagram showing a further example of a digital filter which may be used for the frequency analysis unit 17 in FIG. 1.

Further, for the digital filter 17 used in the present embodiment, a digital filter as shown in FIG. 5 can be used, wherein the difference between the output of an entire band pass filter and the output of a band elimination filter for every characteristic resonance vibration frequency is taken and wherein the delay circuit serves as the entire band pass filter.

In the present embodiment, a predetermined number of digital filters determined according to the number of characteristic resonance vibration frequency components which are determined to be extracted are prepared and the intensities of the predetermined number of vibration frequencies are simultaneously determined via the respective digital filters.

Now, a sampling interval $\tau s$ for the A/D conversion is determined by an inverse number of a frequency of more than two times the maximum frequency to be extracted according to the sampling theorem. Therefore, with respect to the examples in FIG. 7, the maximum frequency to be extracted is 18.1 KHz, and the sampling interval $\tau s$ is determined so as to satisfy the following equation.

$$\tau s \leq 1/(18.1 \times 10^3 \times 2) = 27.6 \times 10^{-6} = 27.6(\mu s)$$

Further, the filter coefficients an1 ... anm, al 1 ... al 4 and bn0 ... bn2 are prepared beforehand in accordance with the digital filter design procedure.

On one hand, the fast Fourier transformation is well known as a measure of frequency analysis, however the fast Fourier transformation analysis necessitates sample numbers of $2^n$. For this reason, the interval for the frequency analysis, in other words, the sampling interval, is determined in discrete terms such as an interval of 2 times and an interval of ½ times of a predetermined interval, and so no continuous variable interval is obtained.

Figure 8:
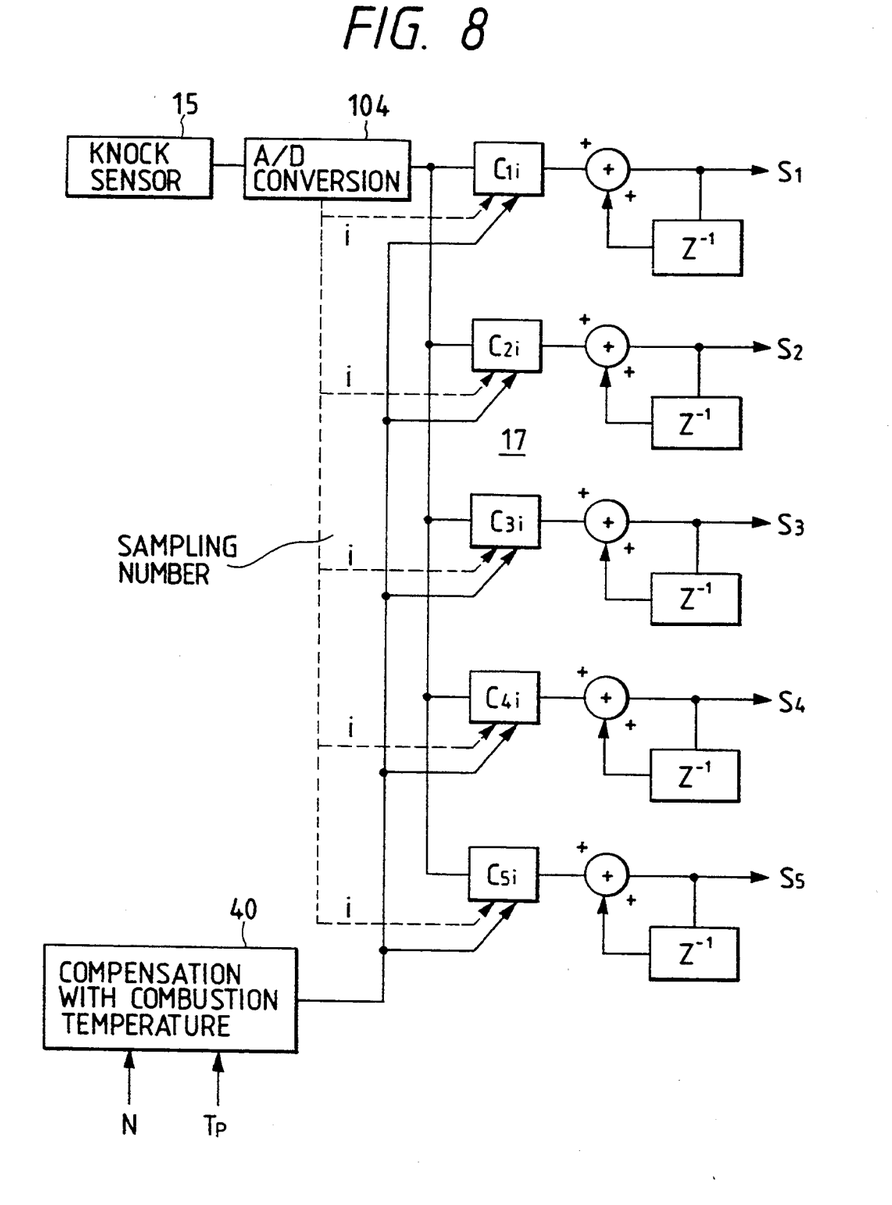
FIG. 8 is a block diagram showing a still further expample of a digital filter which may be used for the frequency analysis unit 17 in FIG. 1.

For resolving the above problem encountered in the fast Fourier transformation, a discrete Fourier transformation is proposed which can determine the intensity of the extracted frequency by multiplying a Fourier coefficient by a respective A/D sampled value without regarding the sampling numbers of $2^n$. FIG. 8 shows a digital filter making use of such discrete Fourier transformation applicable to the present embodiment.

Namely, in the frequency extracting and analyzing means using the discrete Fourier transformation as shown in FIG. 8, the intensity of the frequency component to be extracted is determined by using the Fourier coefficient $Ci$ as shown in the following equation the value of which is varied every time the sampling number $i$ varies, wherein $f$ indicates the frequency to be extracted and $\tau$ indicates the sampling interval.

$$ci = \exp(-j2\pi\tau fi) \quad \text{wherein } j = \sqrt{-1}$$

Further, in FIG. 8 a center frequency correcting means 40 is incorporated in which the combustion temperature in the engine cylinder is estimated by calculation based upon the engine operating conditions, such as the fuel injection time Tp and the engine rotation number N, and depending upon the estimated combustion temperature, the center frequencies of the respective characteristic resonance vibration frequency components set in the respective digital filters 17 are corrected, with the result that the intensities coresponding to the optimum frequencies relating to the characteristic resonance vibration frequency components are always extracted.

Further, in the present embodiment for determining the intensities S1 . . . S5 for the respective characteristic resonance vibration frequency components inherent to the respective resonance vibration modes due to knocking with one of the frequency extracting and analyzing means 17 such as the non-regression type digital filter as shown in FIG. 3, the regression type digital filter as shown in FIG. 4, the combination digital filter of the entire band pass filter and band, elimination filter as shown in FIG. 5 and the digital filter making use of discrete Fourier transformation as shown in FIG. 8, at least three neighboring frequency components for the respective characteristic resonance vibration frequency components are extracted. Then, the characteristic resonance vibration frequency is determined as the center frequency of the three neighboring frequencies to be extracted, and the maximum intensity among the three neighboring frequency components is determined as the intensity for the specific characteristic resonance vibration frequency component. Further, the center frequency of the specific characteristic resonance vibration frequency component is then shifted to the frequency showing the maximum intensity, in that, the center frequency of the digital filter is varied according to the variation of frequency showing the maximum indensity, with the result that the center frequency of the respective digital filters is always tuned to match the current center frequencies of the respective characteristic resonance vibration frequency components inherent to the respective resonance vibration modes due to knocking.

Hereinbelow, the center frequency tuning of the respective digital filters depending upon the variation of the center frequencies of the respective characteristic resonance vibration frequency components is explained with reference to FIG. 1 and FIG. 2(a).

Figures 2A, 2B:
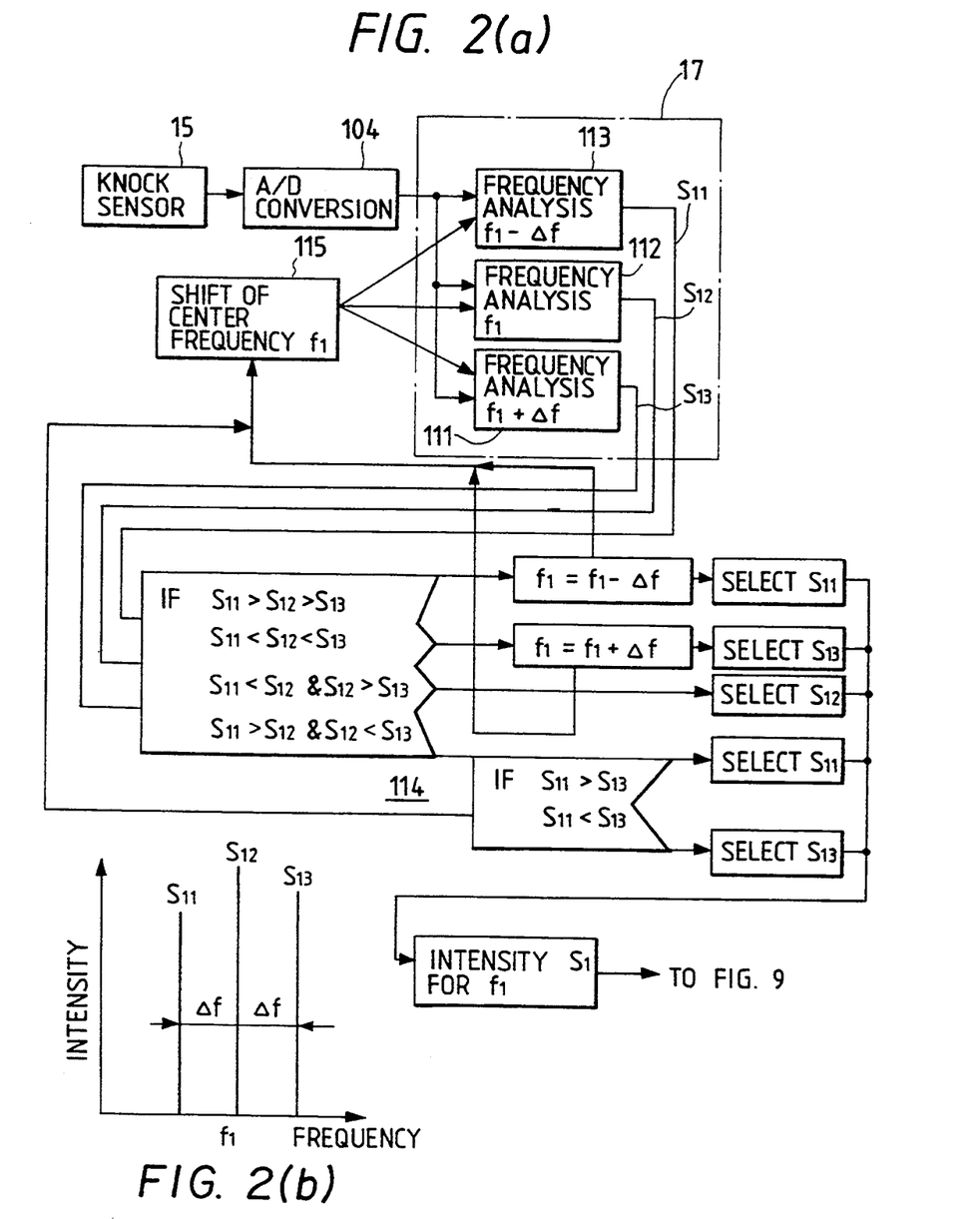
FIG. 2(a) is a block diagram for explaining in detail the frequency analysis unit 17, the maximum intensity selection unit 114 and the center frequency shift unit 115 shown in FIG. 1.
FIG. 2(b) is a characteristic spectra diagram related to FIG. 2(a)

For avoiding complexity, in FIG. 2 only one digital filter unit 17 serving as the frequency extracting and analyzing means for a specific characteristic resonance vibration frequency component fl, a maximum intensity selection unit 114 therefor and a center frequency shift unit 115 therefor are shown. Three digital filters 113, 112 and 111 in the digital filter unit 17 are designed to determine the respective intensities S11, S12 and S13 of three frequency components $f1-\Delta f$, $f1$ and $f1+\Delta f$. Exemplary spectra of the three frequency components are illustrated in FIG. 2(b) of the drawing, wherein the frequency component fl is the center frequency of one specific characteristic resonance vibration frequency component which is determined to be extracted and $\Delta f$ is set about several hundreds Hz which and may vary depending upon the center frequencies of the respective characteristic resonance vibration frequency components to be extracted.

Now, assuming that the intensity S13 for the frequency component $f1+\Delta f$ shows the maximum amplitude level among the three intensities, which implies that the center frequency of the characteristic resonance vibration frequency component has moved toward a higher frequency side by about $\Delta f$, therefore the frequency of the digital filter 112 is tuned to $f1+\Delta f$ through the operation of the maximum intensity selection unit 114 and the center frequency shift unit 115, while the digital filter 113 is tuned to $f1$ and the digital filter 111 is tuned to $f1+2\Delta f$.

On the other hand, when the intensity S11 shows the maximum amplitude level among the three intensities, which implies that the center frequency of the characteristic resonance vibration frequency component has moved toward a lower frequency side by about $\Delta f$, at this instance, the covering frequency of the digital filter 112 is tuned to $f1-\Delta f$ through the operation of the maximum intensity selection unit 114 and the center frequency shift unit 115, while the digital filter 113 is turned to $f1-2\Delta f$ and the digital filter 111 is tuned to $f1$.

When the intensity S12 shows the maximum amplitude level among the three intensities, which implies that the center frequency of the characteristic resonance vibration frequency component is unchanged, the covering frequencies of the three digital filters 112, 113 and 111 are unchanged.

As an alternative of the above, even when the intensity S12 shows the maximum amplitude level among the three intensities, the covering frequency of the digital filter 112 may shift toward the frequency component $f1+\Delta f$ or $f1-\Delta f$ showing higher amplitude level by $\Delta f \times \chi$ (wherein $\chi = 0 \sim 1$), and at this instance, the covering frequencies of the digital filters 113 and 111 are also shifted accordingly. The tuning or the covering frequency shift of the respective digital filters 112, 113 and 111 is performed quite easily only by changing the digital filter coefficients anl . . . amm, al 1 . . . al 4, bn0 . . . bn2, cl . . . c5 as shown in FIGS. 3, 4, 5 and 8.

Figure 9:
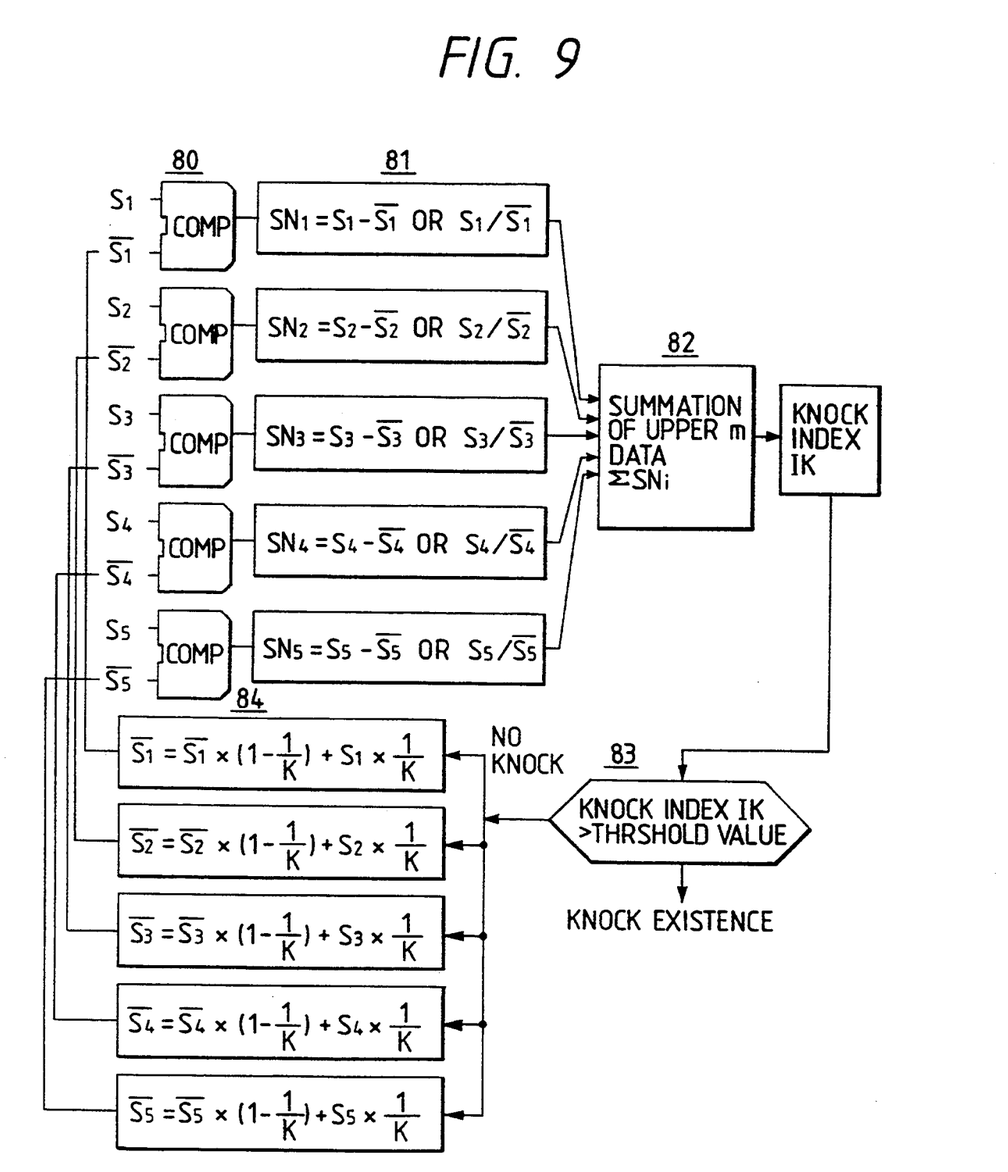
FIG. 9 is a block diagram for explaining in detail the comparison unit 80, 81, the knocking index determination unit 82 and the knock judgement unit 83 shown in FIG. 1.

After the intensities S1 . . . S5 for the respective characteristic resonance vibration frequency components f1 . . . f5 have been determined, the knocking judgement processing is performed as shown in FIG. 1 and FIG. 9.

For the first time, the intensities $S1 \sim S5$ for the respective characteristic resonance vibration frequency components $f1 \sim f5$ are compared at respective comparator units 80 and 81 with respective average values $\overline{S1} \sim \overline{S5}$ determined by averaging a predetermined number of previous samples of the intensities $S1 \sim S5$ when no knocking is determined, and respective differences $S1-\overline{S1}$, $S2-\overline{S2}$, $S3-\overline{S3}$, $S4-\overline{S4}$, and $S5-\overline{S5}$ or ratios $S1/\overline{S1}$, $S2/\overline{S2}$, $S3/\overline{S3}$, $S4/\overline{S4}$ and $S5/\overline{S5}$ are determined therein to obtain respective comparative intensities SN1, SN2, SN3, SN4 and SN5.

Thereafter, a knocking index IK is determined at knock index determination unit 82 by adding the comparative intensities $SN1 \sim SN5$ or by adding a predetermined number of the comparative intensities counting from the largest one.

The obtained knocking index IK is compared at a knocking judgement unit 83 with a predetermined threshold level, which is determined the by a sensory test to determine existence and or non-existence of knocking.

When no knocking is judged at the knocking judgement unit 83, the average intensities $\overline{S1} \sim \overline{S5}$ for the respective characteristic resonance vibration frequency components $f1 \sim f5$ are renewed by making use of the latest intensities $S1 \sim S5$ as follows;

$$\overline{S1} = \overline{S1} \times (1 - 1/K) + S1/K$$

$$\overline{S2} = \overline{S2} \times (1 - 1/K) + S2/K$$

$$\overline{S3} = \overline{S3} \times (1 - 1/K) + S3/K$$

$$\overline{S4} = \overline{S4} \times (1 - 1/K) + S4/K$$

$$\overline{S5} = \overline{S5} \times (1 - 1/K) + S5/K$$

Wherein K is a coefficient for obtaining a moving average and is determined to a number between 4 and 64.

Figure 10:
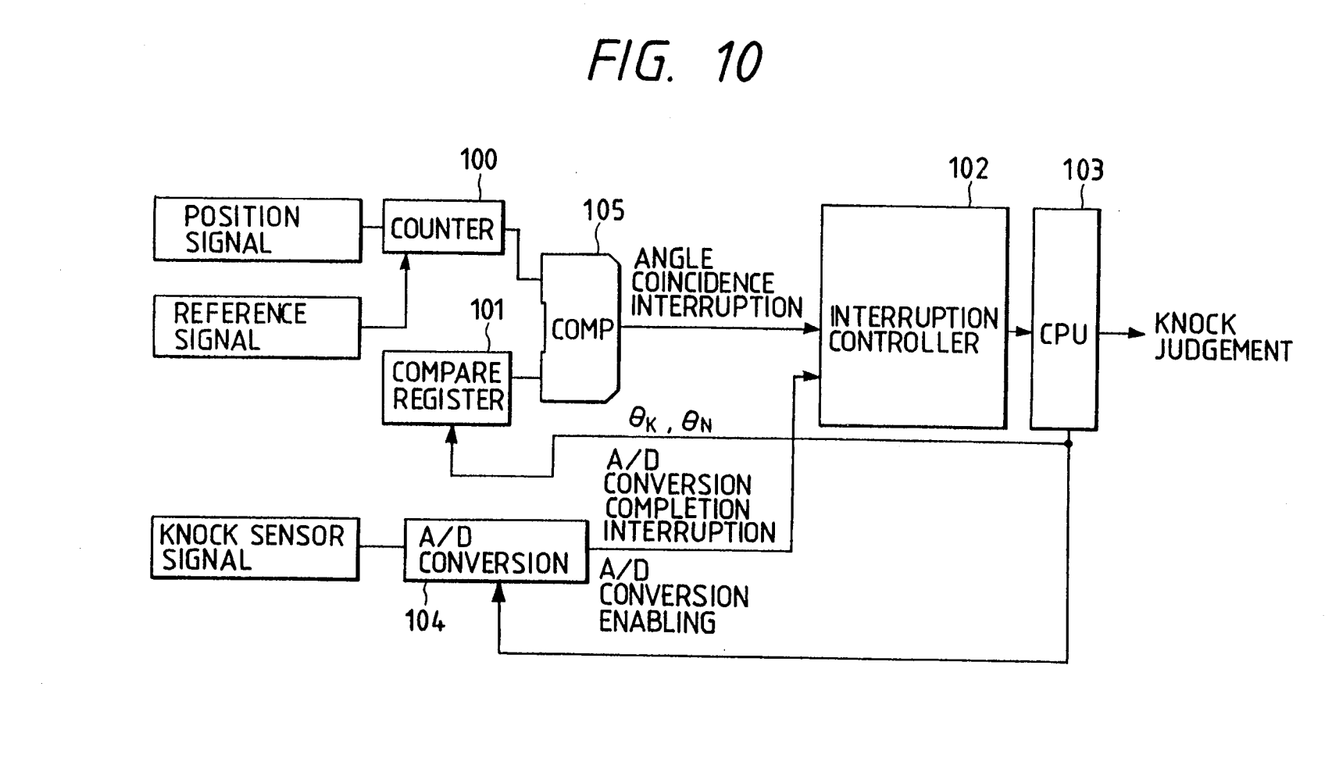
FIG. 10 is a block diagram for explaining in detail the A/D conversion unit 104 and the sampling timing control unit shown in FIG. 1.

Hereinafter, a sampling timing control of the characteristic resonance vibration frequency components f1~f5 will be explained with reference to FIGS. 10, 11 and 12.

In the sampling timing control, there is provided a counter 100, which counts the rising of the position signal Pos and is cleared by the rising of the reference signal Pef; a comparator 105, which compares the count value from the counter 100 with a reference value; a compare register 101, which supplies the reference value to the comparator 105, and an interruption controller 102 which generates an interruption request to a CPU 103 in response to an angle coincidence interruption signal from the comparator 105 when the count value coincides with the reference value.

Figure 11A:
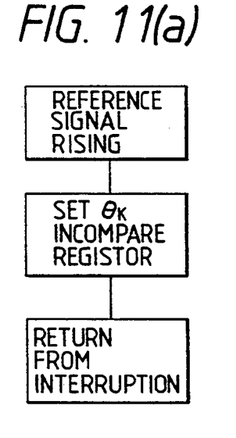
FIGS. 11a–c are flowcharts for explaining the operation of the A/D conversion unit 104 and the sampling timing control unit shown in FIG. 10.
Figure 11B:
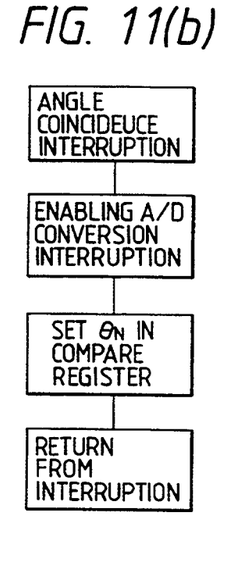
Figure 12:
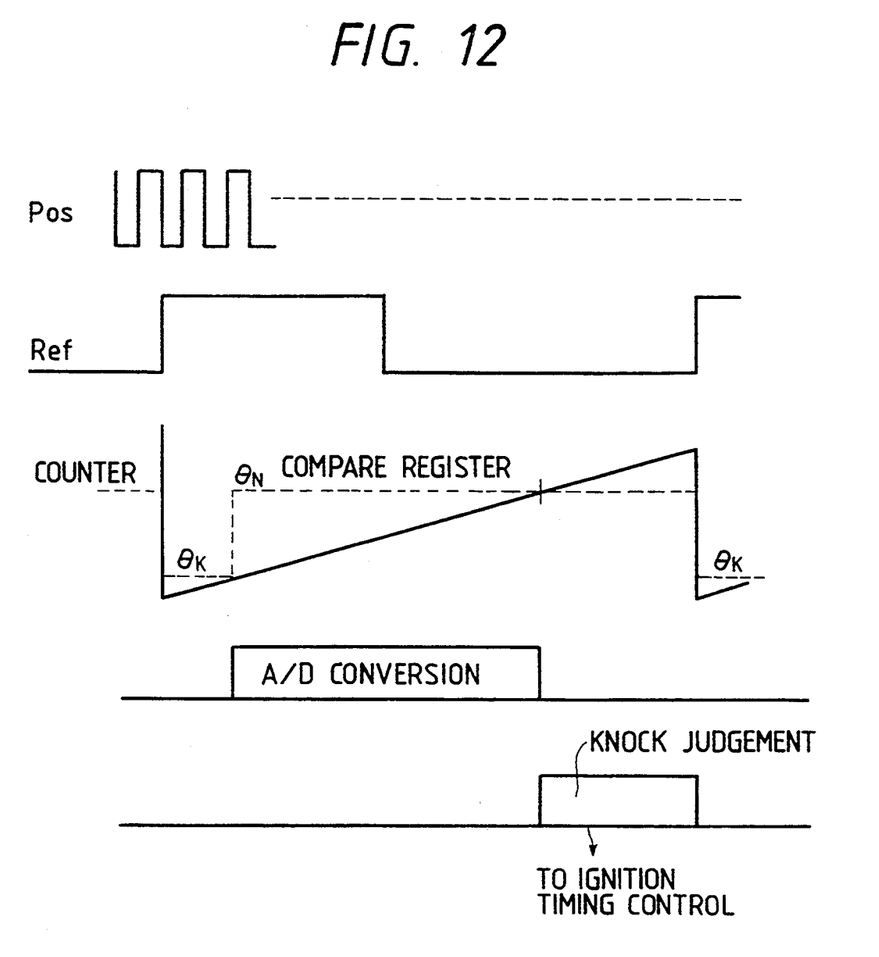
FIG. 12 is a timing chart for explaining the timing of the operation of the A/D conversion unit 104 and the sampling timing control unit shown in FIGS. 11a–c.

As illustrated in FIG. 11(a), when the rising of the reference signal Ref is detected, an interruption is requested to the CPU (not shown in FIG. 10) and an angle $\theta k$ is set in the compare register 101, which determines the angle of starting the conversion operation by the A/D converter 104.

The counter 100 is cleared by the rising of the reference signal Ref and begins counting the position signal Pos starting from zero. When the count value of the counter 100 reaches the set value $\theta k$, the angle coincidence interruption as illustrated in FIG. 11(b) is initiated, in that, an A/D conversion enabling signal is applied to the A/D converter 104 from the CPU 103 and the A/D converter begins A/D conversion. At the same time, an A/D conversion completion angle signal $\theta N$ is supplied from the CPU 103 to the compare register 101 to set the same therein.

Figure 11C:
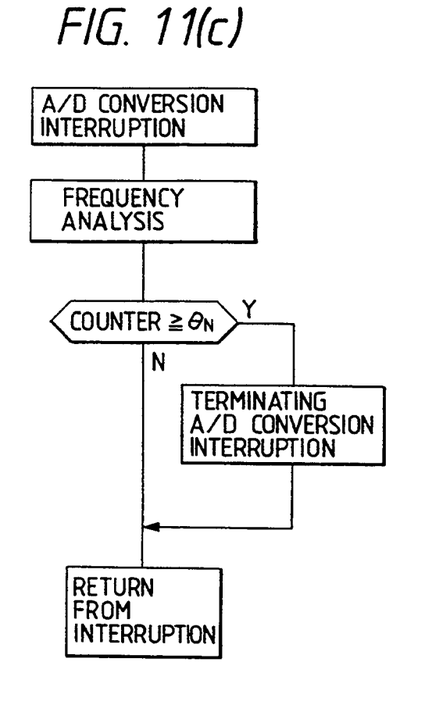

Further, every time the A/D conversion has been completed, an A/D conversion completion interuption signal is sent out to the CPU 103 from the A/D converter 104, the processing as shown in FIG. 11(c) is started, and during the time of the A/D conversion interruption, a sum of product processing in the digital filters is continued until the crank angle reaches $\theta N$.

When the count value of the counter 100, which is counting the position signal Pos, coincides with $\theta N$, an angle coincidence signal is again generated from the comparator 105 and the A/D conversion interruption is prevented. Then, the obtained values by the sum of product processing until that moment are determined as the intensities S1~S5 for he respective characteristic resonance vibration frequency components f1~f5.

Thereafter, as explained in connection with FIG. 9, the comparative intensities SN1~SN5 are obtained from the differences or the ratios between the determined values of S1~S5 and the average values $\overline{S1}$~$\overline{S5}$ to determine the knocking index IK.

Subsequently, the determined knocking index IK is compared with the predetermined knocking threshold level SL at the knocking judgement unit 83, and when the knocking index IK exceeds the threshold level SL, a knocking existence signal is generated. When the knocking index IK is below the threshold level SL, a knocking non-existence signal is generated, and these signals are outputted before the rising of the subsequent reference signal Ref as illustrated in FIG. 12.

The knocking existence and non-existence signals are inputted to the engine control unit 1 at the rising moment of the subsequent reference signal Ref, and when a knocking existence signal is received, the engine control unit 1 performs a well known knocking avoiding control, such as by retarding the ignition timing for the subsequent ignition.

According to the present invention, knocking occurrence is always detected without fail, so that an accurate knock avoiding control is made possible. As a result, a considerable improvement in engine preformance is realized.

According to the present invention, a knocking relating signal is detected with a higher resolution and without fail by making use of the frequency extracting and analyzing means covering limited frequency components inherent to resonance vibration modes due to knocking and further the center frequencies of the respective characteristic resonance vibration frequency components in the frequency component extracting and analyzing means are always adjusted by feeding back the detection results so that the knocking is reliably detected without being affected by such factors as engine operating conditions and secular changes of the engine, to thereby maintain an accurate engine knocking control for the life of the motor vehicle.

We claim:

1. A knock detection device for an internal combustion engine, comprising:

a knocking sensor which detects at least one of mechanical vibration of the engine and internal pressure vibration in the engine and produces an analogue vibration signal;

an A/D converter which converts the analogue vibration signal from said knocking sensor to a digital signal;

a first digital filter unit which operates to cover a first characteristic resonance vibration frequency component for a first resonance vibration mode caused in the engine due to knocking, said first digital filter unit operating to extract a first characteristic resonance vibration frequency component contained in said digital signal and to determine the intensity thereof, wherein said first digital filter unit includes a first digital filter tuned to the center frequency in the characteristic resonance vibration frequency component to determine the intensity thereof, a second digital filter tuned to a neighboring lower frequency with respect to the center frequency in the characteristic resonance vibration frequency component to determine the intensity thereof and a third digital filter tuned to a neighboring higher frequency with respect to the center frequency in the characteristic resonance vibration frequency component to determine the intensity thereof;

a first maximum value selecting unit which is coupled to said first digital filter unit and selects the maximum intensity among the three intensities of the three neighboring frequency components determined respectively by said first, second and third digital filters in said first digital filter unit;

a first comparator which compares the of the first characteristic resonance vibration frequency component selected in said first maximum value selecting unit with a first predetermined background level for the first characteristic resonance vibration frequency component to determine first comparative intensity for the first characteristic resonance vibration frequency component;

a first center frequency shifting unit which shifts the center frequency of said first digital filter in said first digital filter unit dependent upon the selected frequency showing the maximum intensity in said first maximum value selecting unit;

a second digital filter unit which is designed to cover a second characteristic resonance vibration frequency component for a second resonance vibration mode caused in the engine due to knocking, said second digital filter unit operating to extract a second characteristic resonance vibration frequency component contained in the digital signal and to determine the intensity thereof, wherein said second digital filter unit includes a first digital filter tuned to the center frequency in the characteristic resonance vibration frequency component to determine the intensity thereof, a second digital filter tuned to a neighboring lower frequency with respect to the center frequency in the characteristic resonance vibration frequency component to determine the intensity thereof and a third digital filter tuned to a neighboring higher frequency with respect to the center frequency in the characteristic resonance vibration frequency component to determine the intensity thereof;

a second maximum value selecting unit which is coupled to said second digital filter unit and selects maximum intensity among the three intensities of the three neighboring frequency components determined respectively by said first, second and third digital filters in said second digital filter unit;

a second comparator which compares the maximum intensity of the second characteristic resonance vibration frequency component selected in said second maximum value selecting unit with a second predetermined background level for the second characteristic resonance vibration frequency component to determine a second comparative intensity for the second characteristic resonance vibration frequency component;

a second center frequency shifting unit which shifts the center frequency of said first digital filter in said second digital filter unit dependent upon the selected frequency showing the maximum intensity in said second maximum value selecting unit;

a knocking index determining unit which determines a knocking index based upon the first comparative intensity for the first characteristic resonance vibration frequency component determined in said first comparator and the second comparative intensity for the second characteristic resonance vibration frequency component determined in said second comparator; and a knocking judging unit which compares the knocking index determined by said knocking index determining unit with a predetermined knocking threshold value and generates a knocking signal when the knocking index exceeds the predetermined knocking threshold value.

2. A knock detection device for an internal combustion engine according to claim 1, wherein the neighboring lower frequencies of said respective second digital filters in said first digital filter unit and in said second digital filter unit are selected to be lower by about several hundreds Hz than the respective center frequencies of the characteristic resonance vibration frequency components and the neighboring higher frequencies of said respective third digital filters in said first digital filter unit and in said second digital filter unit are selected to be higher by about several hundreds Hz than the respective center frequencies of the characteristic resonance vibration frequency components.

3. A knock detection device for an internal combustion engine according to claim 1, further comprising;
   a sonic velocity determining unit which determines the sonic velocity in the engine based upon engine operating conditions; and
   a center frequency correcting unit which corrects the center frequencies of said respective first digital filters in said first digital filter unit and in said second digital filter unit dependent upon the determined sonic velocity by said sonic velocity determining unit.

4. A knock detection device for an internal combustion engine according to claim 1, further comprising:
   a third digital filter unit which operates to cover a third characteristic resonance vibration frequency component for a third resonance vibration mode caused in the engine due to knocking, said third digital filter unit operating to extract a third characteristic resonance vibration frequency component contained in the digital signal and to determine the intensity thereof, and further said third digital filter unit includes a first digital filter tuned to the center frequency in the characteristic resonance frequency component to determine the intensity thereof, a second digital filter tuned to a neighboring lower frequency with respect to the center frequency in the characteristic resonance vibration frequency component to determine the intensity thereof and a third digital filter tuned to a neighboring higher frequency with respect to the center frequency in the characteristic resonance vibration frequency component to determine the intensity thereof;
   a third maximum value selecting unit which selects the maximum intensity among the three intensities of the three neighboring frequency components determined respectively by said first, second and third digital filters in said third digital filter unit;
   a third comparator which compares the maximum intensity of the third characteristic resonance vibration frequency component selected in said third maximum value selecting unit with a third predetermined background level for the third characteristic resonance vibration frequency component to determine a third comparative intensity for the third characteristic resonance vibration frequency component; and
   a third center frequency shifting unit which shifts the center frequency of said first digital filter in said third digital filter unit dependent upon the selected frequency showing the maximum intensity in said third maximum value selecting unit, and further said knocking index determining unit operates to determine the knocking index by adding a predetermined number of the comparative intensities for the respective characteristic resonance vibration frequency components counting from the largest one.

5. A knock detection device for an internal combustion engine according to claim 1, further comprising:
   a background level determining unit which operates to determine the first and second predetermined background level values, respectively, by averaging a predetermined number of sampled maximum intensity values for the respective covering characteristic resonance vibration frequency components when no knocking is detected by said knock judging unit, said knocking judging unit operating to feed back the maximum intensity values for the respective characteristic resonance vibration frequency components to said background level determining unit every time said knock judging unit judges that no knocking exists and, said background level determining unit operates to renew the first and second predetermined background levels by making use of the fed-back maximum intensity values for the respective characteristic resonance vibration frequency components.

6. A knock detection device for an internal combustion engine according to claim 1, wherein said first and second digital filter units are constituted by one of a finite impulse response type filter, an infinite impulse response type filter, a combination of a band elimination filter and an entire band pass filter and a filter making use of a discrete Fourier transformation.

* * * * *